United States Patent
Sheynblat

(10) Patent No.: US 8,736,488 B2
(45) Date of Patent: *May 27, 2014

(54) BASE STATION ALMANAC ASSISTED POSITIONING

(75) Inventor: Leonid Sheynblat, Hillsborough, CA (US)

(73) Assignee: QUALCOMM Incorporated, San Diego, CA (US)

(*) Notice: Subject to any disclaimer, the term of this patent is extended or adjusted under 35 U.S.C. 154(b) by 504 days.

This patent is subject to a terminal disclaimer.

(21) Appl. No.: 12/625,343

(22) Filed: Nov. 24, 2009

(65) Prior Publication Data

US 2010/0097996 A1   Apr. 22, 2010

Related U.S. Application Data

(62) Division of application No. 11/332,116, filed on Jan. 12, 2006, now Pat. No. 7,821,449.

(60) Provisional application No. 60/643,562, filed on Jan. 12, 2005.

(51) Int. Cl.
  *G01S 19/45* (2010.01)
  *G01S 19/48* (2010.01)
  *G01S 19/32* (2010.01)

(52) U.S. Cl.
  USPC ............. 342/357.28; 342/357.31; 342/357.72

(58) Field of Classification Search
  USPC ............... 342/357.2, 357.28, 357.31, 357.72, 342/357.73; 370/328; 707/769, 770
  See application file for complete search history.

(56) References Cited

U.S. PATENT DOCUMENTS

| | | |
|---|---|---|
| 5,862,480 A | 1/1999 | Wild et al. |
| 6,941,143 B2 | 9/2005 | Mathur |
| 6,941,146 B2 | 9/2005 | Knauerhase et al. |
| 7,076,256 B1 * | 7/2006 | Orler et al. .................. 455/456.1 |
| 7,286,838 B2 | 10/2007 | Knauerhase et al. |
| 7,359,706 B2 | 4/2008 | Zhao |
| 7,821,449 B2 | 10/2010 | Sheynblat |
| 2003/0050070 A1 | 3/2003 | Mashinsky et al. |
| 2003/0081567 A1 | 5/2003 | Okanoue et al. |
| 2003/0220116 A1 | 11/2003 | Sagefalk et al. |
| 2004/0082311 A1 * | 4/2004 | Shiu et al. ..................... 455/403 |
| 2004/0219930 A1 | 11/2004 | Lin |
| 2004/0259546 A1 | 12/2004 | Balachandran et al. |

(Continued)

FOREIGN PATENT DOCUMENTS

| EP | 0980190 | 2/2000 |
|---|---|---|
| GB | 2391767 | 2/2004 |

(Continued)

OTHER PUBLICATIONS

International Search Report—PCT/US06/026190, International Search Authority—European Patent Office, Dec. 11, 2006.

(Continued)

*Primary Examiner* — Dao Phan
(74) *Attorney, Agent, or Firm* — Arnold J. Gum

(57) ABSTRACT

A database provides base station almanac information pertaining to more than one network mode of communication. A wireless device accesses this database through a centralized server or network, or via the base station, base station controller or the like, with which it is currently communicating.

35 Claims, 1 Drawing Sheet

(56) References Cited

U.S. PATENT DOCUMENTS

| | | |
|---|---|---|
| 2005/0078033 A1 | 4/2005 | Tamaki et al. |
| 2005/0111409 A1 | 5/2005 | Spear et al. |
| 2005/0239443 A1 | 10/2005 | Watanabe et al. |
| 2006/0092890 A1 | 5/2006 | Gupta et al. |
| 2006/0293052 A1 | 12/2006 | Orler et al. |
| 2007/0161401 A1 | 7/2007 | Sheynblat |
| 2012/0179660 A1 | 7/2012 | Sheynblat |
| 2013/0040637 A1 | 2/2013 | Sheynblat |

FOREIGN PATENT DOCUMENTS

| | | |
|---|---|---|
| JP | 2002374259 A | 12/2002 |
| JP | 2003134133 A | 5/2003 |
| JP | 2003259457 A | 9/2003 |
| JP | 2003319454 A | 11/2003 |
| JP | 2004140459 A | 5/2004 |
| JP | 2004207822 A | 7/2004 |
| JP | 2004289487 A | 10/2004 |
| JP | 2005286864 A | 10/2005 |
| JP | 2007501591 T | 1/2007 |
| WO | 9013211 | 11/1990 |
| WO | 2005004527 | 1/2005 |
| WO | 2005004528 | 1/2005 |
| WO | 2005043940 A1 | 5/2005 |
| WO | 2005051019 | 6/2005 |

OTHER PUBLICATIONS

Written Opinion—PCT/US06/026190, International Search Authority—European Patent Office, Dec. 11, 2006.

\* cited by examiner

BASE STATION ALMANAC ASSISTED POSITIONING

RELATED APPLICATIONS

This application is a Divisional of U.S. patent application Ser. No. 11/332,116, granted as U.S. Pat. No. 7,821,449, filed Jan. 12, 2006, entitled "Base Station Almanac Assisted Positioning," which claims the benefit of U.S. Provisional Application No. 60/643,562, filed on Jan. 12, 2005, each of which is hereby incorporated by reference herein in its entirety.

TECHNICAL FIELD

The present method and apparatus relates generally to positioning systems for wireless user equipment, and more specifically to an almanac that contains the base station database for all or select set of base stations of a specific type.

BACKGROUND

Location determination systems allow wireless devices to find their geographic location or be located by remote entities by using satellites (e.g., GLONASS, GPS, Galileo, EGNOS, Globalstar, IRIDIUM) and/or base stations (e.g., cellular telephone base station, a wireless local area network, a wireless wide area network, satellite phone, satellite Internet, or any other device that can be uniquely recognized and communicate with the wireless device). These stations may be coupled to a base station almanac processor by way of a wide area network (WAN), but may also or alternatively use a local area network (LAN). The base station almanac processor accesses a base station database to tailor or customize an almanac according to the estimated location of the wireless device.

The wireless device can communicate with any number of devices to provide location information. The wireless device may be, for example, a cellular telephone that may have any number or combination of communication modes (e.g., GSM, CDMA, TDMA, WCDMA, OFDM, GPRS, EV-DO, WiFi, Bluetooth, WiMAX, 802.xx, UWB, satellite, etc.) to transfer voice and/or data with cellular, satellite, wireless data, and/or mesh networks by way of their base stations. The wireless device could also be a tracking device, a child or parolee monitor, navigational device, wireless pager, wireless computer, PDA, asset tag, etc.

SUMMARY

The method and apparatus disclosed herein provides an almanac that may contain the base station database for all or select set of base stations of a specific type (e.g., CDMA or WiFi or Bluetooth base stations).

BRIEF DESCRIPTION OF THE DRAWINGS

The present disclosure is described in conjunction with the appended FIGURE.

DESCRIPTION

Figure 1:
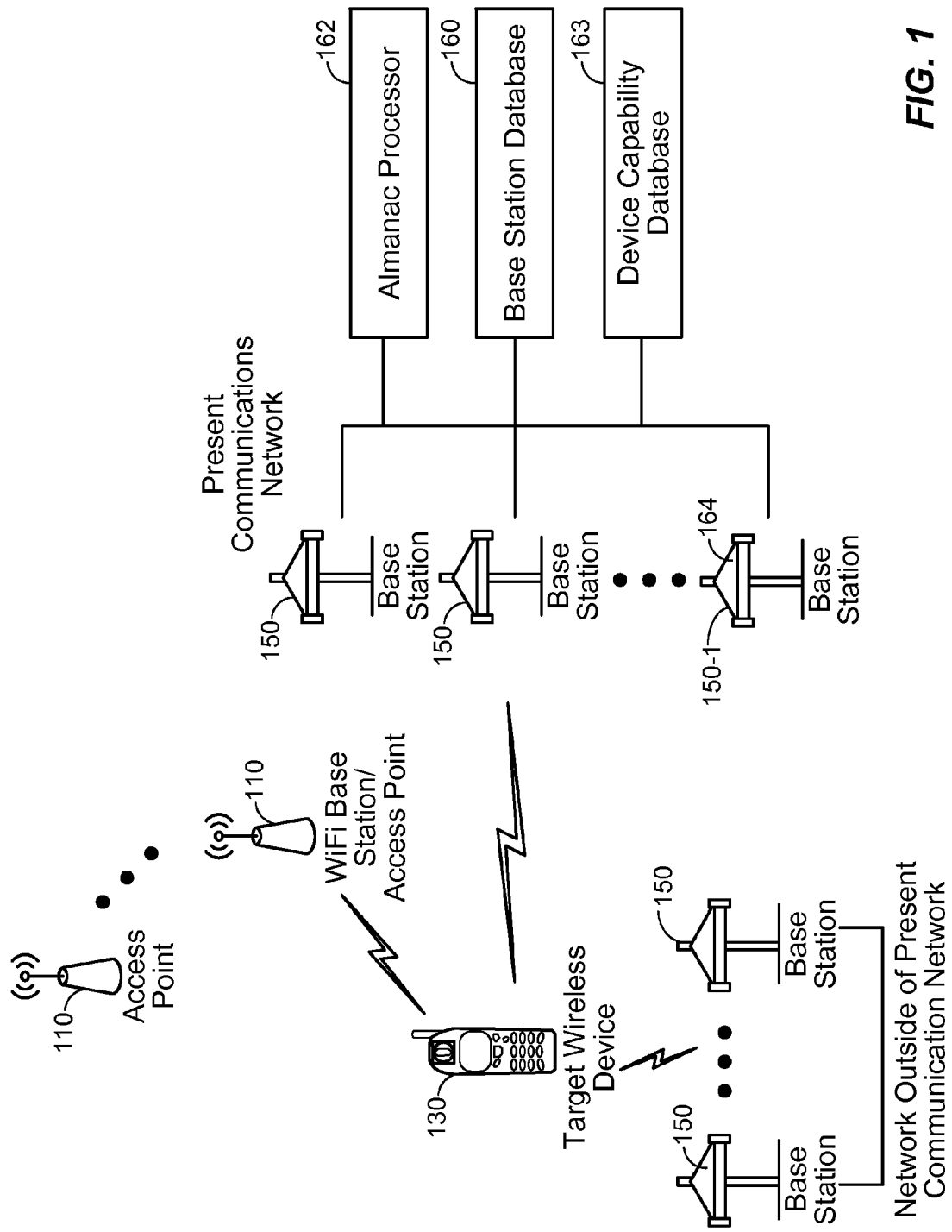
FIG. 1 is a diagram of an embodiment of a wireless communication system.

With the proliferation of multi-mode devices, the base station almanac for one particular mode of operation is not sufficient. If a target device can operate in more than one mode (e.g., CDMA and WiFi) for radio-location and communication purposes the device needs to know the almanac for both types of the base stations to operate properly. One feature of interest is the ability to seamlessly roam between the base stations of the same type or be handed over to a base station of a different type.

Referring to FIG. 1, either a centralized or a localized base station database 160 can be maintained for the base stations of the supported and relevant modes of communication (for example, may not be interested in the OMEGA base stations).

The supported communication modes for each wireless device 130 can be stored in a device capability database 163 that includes information to help in determining an uncertainty factor for each location or distance measurement made by a particular wireless device operating in any number of communication modes.

The almanac processor 162 may be separate from the base stations 150 (as shown), but each base station 150 or a group of base stations 150 could have a base station almanac processor 162 and/or databases in other embodiments. Alternatively, the almanac processor 162 can be integrated into the wireless device 130. The base station database 160 and/or device capability database 163 could also be in the wireless device 130 and updated periodically.

In some embodiments, the base station database 160 may be centrally located (as illustrated in FIG. 1), in others the base station database 160 may be distributed regionally or in portions relevant to each base station 150 or a group of base stations 150 as a local almanac. For example, a first base station 150-1, may store a portion of the base station database for its footprint and all adjacent base station footprints in a first local almanac 164. In another example, the first almanac may not be geographically organized but contain the base stations which are part of a particular service provider network. As the centrally-located base station database 160 is updated, those changes are propagated to the various local almanacs that might use the new information.

A target device 130 having access to the relevant base station almanac will be able to determine the location information given the knowledge of the communication mode and the identification of the base station 150 or a group of base stations 150 in the communication with the target device 130. The location determination can be performed either by the target device 130 or with the target-device assistance. In the target device-assisted mode, the device 130 provides the information sufficient for the location determination by the external entity.

To further improve the search of the base station almanacs for the appropriate information, the data can be organized utilizing the hierarchical coverage scheme. For a particular region, for example, the Bay Area, or area identified by SID/NID, the number of CDMA and GSM switches can be listed. Under each switch a number of GSM and CDMA base station controllers can be listed. For each base station controller a number of base stations are provided, for each base station a number of sectors (typically from 1 to 6). For each sector, the base station almanac can contain the number of know WiFi base stations (access points 110) located within the coverage of the particular sector. The same can be done for other local area base stations such as Bluetooth, UWB, ZigBee, RFID, etc. This classification can be extended to show cross references whereby some of the local area base stations can be within the signal coverage of the other local are base stations providing further granularity to the location information. For example, a number of Bluetooth base stations can be within coverage of a particular WiFi access point 110.

Each "computer", "base station", "base station controller", "server", or other network infrastructure, "wireless device", "mobile station", or "user equipment", referred to herein includes the necessary "computer-readable" media to perform the functions described herein, or is in communication with the necessary computer-readable media. The term "computer-readable medium" refers to any medium that participates in providing instructions to a processor for execution. The singular "medium" is defined herein to include the plural "media".

"Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media. The term "data" as used herein refers to information.

It will be understood as used herein that a processor or microprocessor can, but need not necessarily include, one or more microprocessors, embedded processors, controllers, application specific integrated circuits (ASICs), digital signal processors (DSPs), and the like. The terms processor and microprocessor are intended to describe hardware implementing the functions described rather than specific hardware. As used herein the term "memory" refers to any type of long term, short term, or other memory associated with the computer or other described device, and is not to be limited to any particular type of memory or number of memories, or type of media upon which memory is stored.

What is claimed is:

1. A computer readable non-transitory medium tangibly embodying instructions for:
   accessing a database comprising wireless base station almanac information pertaining to at least two network modes of operation; and
   retrieving, from the database comprising wireless base station almanac information pertaining to the at least two network modes of operation, base station almanac information relevant to a selected communication mode.

2. The computer readable non-transitory medium of claim 1, further embodying instructions for determining supported modes for a multimode wireless communication device from a device capability database.

3. The computer readable non-transitory medium of claim 1, wherein the at least two network modes comprise a CDMA mode and a WiFi mode.

4. The computer readable non-transitory medium of claim 1, wherein the at least two network modes comprise at least two modes from a group consisting of a GSM mode, a CDMA mode, a TDMA mode, a WCDMA mode, an OFDM mode, a GPRS mode, an EV-DO mode, a WiFi mode, a Bluetooth mode, an 802.xx mode, an UWB mode, and a satellite mode.

5. The computer readable non-transitory medium of claim 1, wherein accessing the database containing base station almanac information comprises accessing a local almanac having a base station footprint and adjacent base station footprints.

6. The computer readable non-transitory medium of claim 1, wherein accessing the database containing base station almanac information comprises accessing a centrally located base station database.

7. The computer readable non-transitory medium of claim 1, wherein accessing the database containing base station almanac information comprises accessing a database organized according to a hierarchical coverage scheme.

8. The computer readable non-transitory medium of claim 7, wherein the hierarchical coverage scheme is organized according to CDMA switches.

9. The computer readable non-transitory medium of claim 7, wherein the hierarchical coverage scheme is organized according to GSM switches.

10. The computer readable non-transitory medium of claim 7, wherein the hierarchical coverage scheme is organized according to SID/NID.

11. The computer readable non-transitory medium of claim 1, wherein the database containing base station almanac information comprises a number of known WiFi access points within a particular base station sector.

12. The computer readable non-transitory medium of claim 1, wherein the database containing base station almanac information comprises information for at least one base station type selected from the group comprising Bluetooth, UWB, ZigBee, and RFID.

13. The computer readable non-transitory medium of claim 1, further embodying instructions for processing a request for base station almanac information pertaining to a network outside of a present communication network of a multimode wireless device.

14. The computer readable non-transitory medium of claim 1, wherein retrieving base station almanac information comprises retrieving base station almanac information pertaining to a network outside of a present communication network of a multimode wireless device.

15. The computer readable non-transitory medium of claim 1, wherein retrieving base station almanac information comprises retrieving base station almanac information according to an estimated location of a multimode wireless device.

16. A method comprising:
    accessing, using a multimode wireless communication device, a database comprising wireless base station almanac information pertaining to at least two network modes of operation; and
    retrieving, from the database comprising wireless base station almanac information pertaining to the at least two network modes of operation, base station almanac information relevant to a selected communication mode for use by the multimode wireless communication device.

17. The method of claim 16, further comprising:
    determining supported modes for the multimode wireless communication device from a device capability database.

18. The method of claim 16, wherein the at least two network modes comprise at least two modes from a group consisting of a GSM mode, a CDMA mode, a TDMA mode, a WCDMA mode, an OFDM mode, a GPRS mode, an EV-DO mode, a WiFi mode, a Bluetooth mode, an 802.xx mode, an UWB mode, and a satellite mode.

19. The method of claim 16, wherein accessing the database comprising base station almanac information comprises one or more of:
    accessing a local almanac having a base station footprint and adjacent base station footprints; and
    accessing a centrally located base station database.

20. The method of claim 16, wherein accessing the database comprising base station almanac information comprises:
    accessing a database organized according to a hierarchical coverage scheme.

21. The method of claim 20, wherein the hierarchical coverage scheme is organized according to one or more of: CDMA switches, GSM switches, and SID/NID.

22. The method of claim 16, wherein the database comprising base station almanac information comprises one or more of: a number of known WiFi access points within a particular base station sector, and information for at least one base station type selected from the group comprising Bluetooth, UWB, ZigBee, and RFID.

23. The method of claim 16, wherein retrieving base station almanac information comprises retrieving base station almanac information pertaining to a network outside of a present communication network of a multimode wireless device.

24. A mobile station apparatus comprising:
 a computer-based device configured to:
  access a database comprising wireless base station almanac information pertaining to at least two network modes of operation; and
  retrieve, from the database comprising wireless base station almanac information pertaining to the at least two network modes of operation, base station almanac information relevant to a selected communication mode.

25. The apparatus of claim 24, wherein the computer-based device is further configured to:
 determine supported modes for a multimode wireless communication device from a device capability database.

26. The apparatus of claim 24, wherein the at least two network modes comprise at least two modes from a group consisting of a GSM mode, a CDMA mode, a TDMA mode, a WCDMA mode, an OFDM mode, a GPRS mode, an EV-DO mode, a WiFi mode, a Bluetooth mode, an 802.xx mode, an UWB mode, and a satellite mode.

27. The apparatus of claim 24, wherein the computer-based device configured to access the database comprising base station almanac information is configured to perform one or more of:
 access a local almanac having a base station footprint and adjacent base station footprints; and
 access a centrally located base station database.

28. The apparatus of claim 24, wherein the computer-based device configured to access the database comprising base station almanac information is configured to:
 access a database organized according to a hierarchical coverage scheme.

29. The apparatus claim 28, wherein the hierarchical coverage scheme is organized according to one or more of: CDMA switches, GSM switches, and SID/NID.

30. An apparatus comprising:
 means for accessing a database comprising wireless base station almanac information pertaining to at least two network modes of operation; and
 means for retrieving, from the database comprising wireless base station almanac information pertaining to the at least two network modes of operation, base station almanac information relevant to a selected communication mode.

31. The apparatus of claim 30, wherein the apparatus further comprises:
 means for determining supported modes for a multimode wireless communication device from a device capability database.

32. The apparatus of claim 30, wherein the at least two network modes comprise at least two modes from a group consisting of a GSM mode, a CDMA mode, a TDMA mode, a WCDMA mode, an OFDM mode, a GPRS mode, an EV-DO mode, a WiFi mode, a Bluetooth mode, an 802.xx mode, an UWB mode, and a satellite mode.

33. The apparatus of claim 30, wherein the means for accessing comprise one or more of:
 means for accessing a local almanac having a base station footprint and adjacent base station footprints; and
 means for accessing a centrally located base station database.

34. The apparatus of claim 30, wherein the means for accessing comprise:
 means for accessing a database organized according to a hierarchical coverage scheme.

35. The apparatus claim 34, wherein the hierarchical coverage scheme is organized according to one or more of: CDMA switches, GSM switches, and SID/NID.

* * * * *